Figure 1:
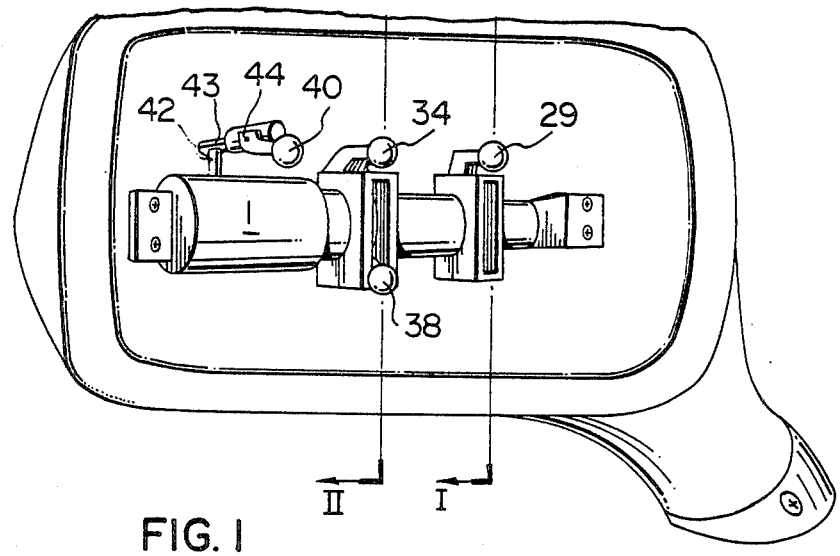

United States Patent [19]

Wunsch et al.

[11] Patent Number: 4,474,428

[45] Date of Patent: Oct. 2, 1984

[54] REAR VIEW MIRROR ADJUSTABLE BY ELECTRIC MOTOR

[75] Inventors: Erich Wunsch, Schwieberdingen; Udo Wunsch, Berlin; Eckart Wunsch, Vogtsburg-Altvogtsburg, all of Fed. Rep. of Germany

[73] Assignee: Efrudec GmbH, Schwieberdingen, Fed. Rep. of Germany

[21] Appl. No.: 322,339

[22] Filed: Nov. 18, 1981

[30] Foreign Application Priority Data

Nov. 19, 1980 [DE] Fed. Rep. of Germany ....... 3043594

[51] Int. Cl.³ .............................................. G02B 5/08
[52] U.S. Cl. .................................. 350/289; 74/501 M
[58] Field of Search ...................... 350/289; 74/501 M

[56] References Cited

U.S. PATENT DOCUMENTS

| | | | |
|---|---|---|---|
| 2,862,420 | 12/1958 | Hazelroth | 350/289 |
| 2,906,292 | 9/1959 | Mayo | 350/289 |
| 3,215,391 | 11/1965 | Storm | 350/289 |
| 4,112,784 | 9/1978 | Cosh | 74/501 M X |
| 4,341,444 | 7/1982 | Stelma | 350/289 |

FOREIGN PATENT DOCUMENTS 2509188 9/1979 Fed. Rep. of Germany ...... 350/289

Primary Examiner—John K. Corbin
Assistant Examiner—David Lewis
Attorney, Agent, or Firm—Martin A. Farber

[57] ABSTRACT

A remote-controlled rear-view mirror assembly having a mirror is movably supported in a housing and can be adjusted by an electric motor from a remote point. An electric motor is mounted in the mirror housing and has an electrically reversible direction of rotation and a stepdown gearing. There is a drive shaft having approximately at its center a driven coaxial cylinder of enlarged diameter with respect to the diameter of the drive shaft and a central annular shoulder dividing the coaxial cylinder into two substantially equal sections. A slipping clutch connects the motor with the drive shaft. Two eccentrics are rotatably mounted on the drive shaft on opposite sides respectively of the equal sections of the coaxial cylinder, each of these eccentrics comprises a cylindrical section and an eccentric disc. There are two wrap springs each of these wrap springs being wound in the same direction partly on one of the two equal sections and partly on one of the two cylindrical section of the eccentrics respectively. A transmission means connects the eccentric discs respectively to the mirror.

11 Claims, 12 Drawing Figures

REAR VIEW MIRROR ADJUSTABLE BY ELECTRIC MOTOR

The present invention relates to a remote-controlled rear-view mirror having a mirror mounted movably in a mirror housing and adjustable by an electric motor from a remote point.

Remote-controlled rear-view mirrors on automotive vehicles which can be adjusted in such a manner that the traffic to the rear can be observed by the driver from the driver's seat without repeated troublesome climbing into and out of the car are already known.

In these known remote-control rear-view mirrors two electric motors are used which can be controlled independently of each other, one of them taking care of the displacement in the horizontal axis while the other one serves to displace the mirror in the vertical axis.

Such rear-view mirrors have the disadvantage that the adjustment device takes up a relatively large amount of space so that the mirror housing must be made relatively large in order to provide for them. This fact also means that such remote-control adjusting devices cannot be provided in conventional mirror housing. In addition to this, the use of two electric motors substantially increases the cost of such rear-view mirrors.

Adjustment of rear-view mirrors with only a single electric motor and a transmission which can be electromagnetically switched alternately to one or the other pivot axis of the mirror is also known. This type of mirror adjustment is, however, structurally costly and therefore correspondingly expensive to manufacture.

Therefore the object of the present invention is to provide a device for the adjustment of mirrors by an electric motor which takes up only a small amount of space and which furthermore can be offered at a considerably lower price than the known adjustment devices.

This object is achieved in a rearview mirror of the above-designated type in the manner that an electric motor whose direction of rotation can be electrically reversed and which has a stepdown gearing behind it acts via a slipping clutch on a drive shaft which is provided, approximately at its center, with a coaxial cylinder of larger diameter which is divided by a central annular shoulder into two equal sections, each of which is grasped by one half of wrap springs which are wound in the same direction, the other half of which cooperates with the cylinder section of two eccentric discs mounted on both sides of the driven cylinder on the drive shaft, the discs being connected with the mirror via transmission members.

As a further development of the invention it is provided that the transmission members are developed as guided fork levers which surround the eccentric without play on two sides and are provided with swivel balls which are received without play by ball sockets on the mirror side. As a modification of this embodiment, the transmission members can also be developed as floatingly mounted eccentric rings which surround the eccentrics without play and to which, in turn, an eccentric rod bearing swivel balls is fastened.

In a further embodiment, the transmission member is developed as a semi-circular yoke which is displaceably mounted in the housing and has a receiver for a drive pin which is fastened to the fork lever described in the first embodiment.

Figure 2:
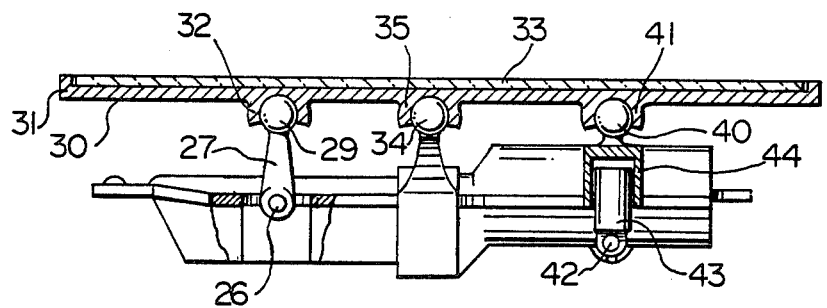
Figure 3:
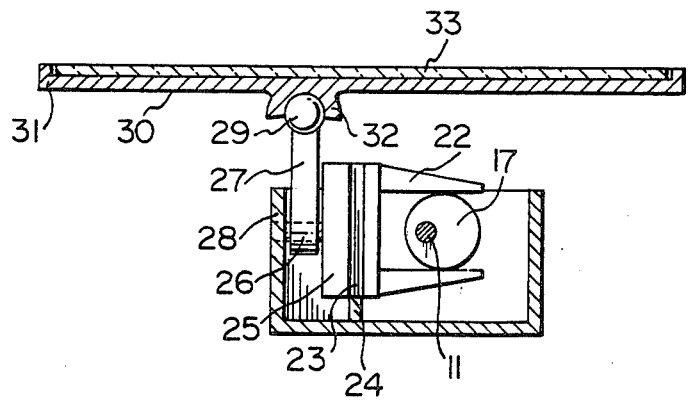
Figure 4:
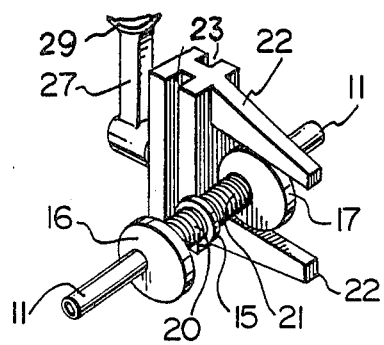
Figure 5:
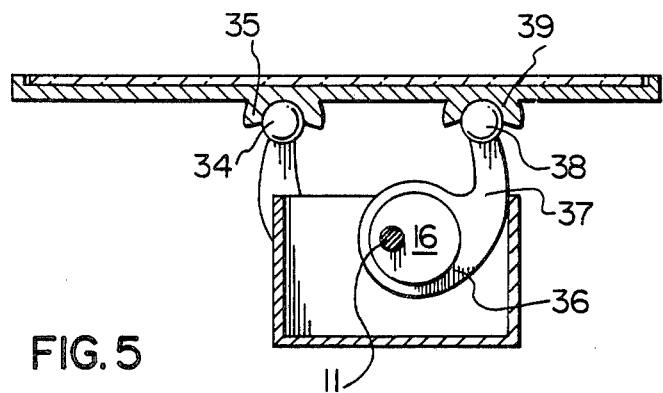
Figure 6:
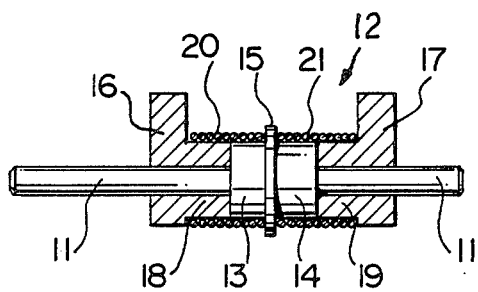
Figure 7:
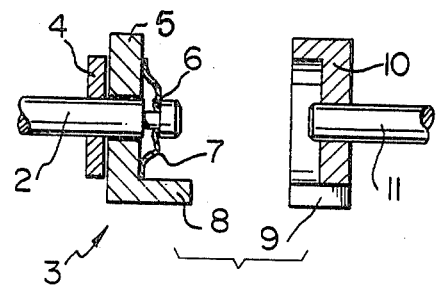
Figure 8:
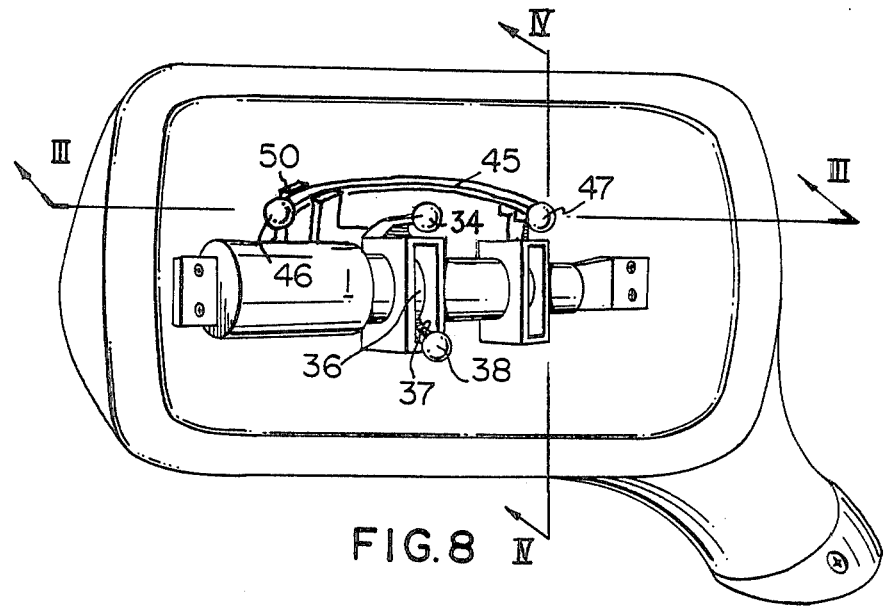
Figure 9:
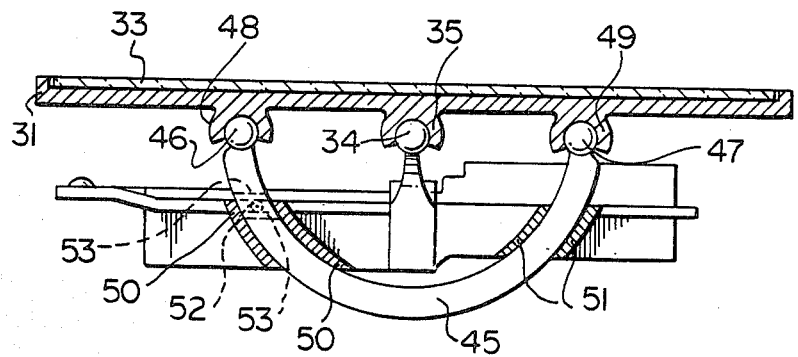
Figure 10:
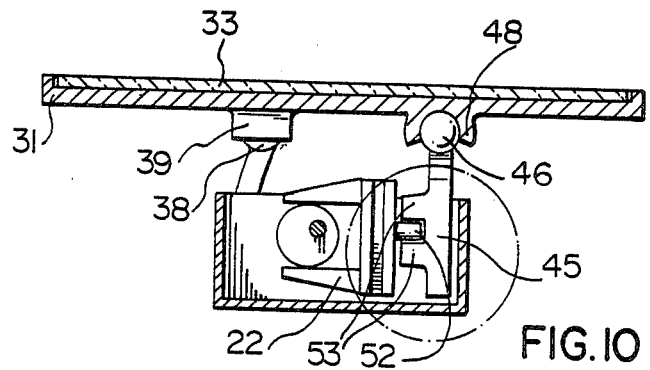
Figure 11:
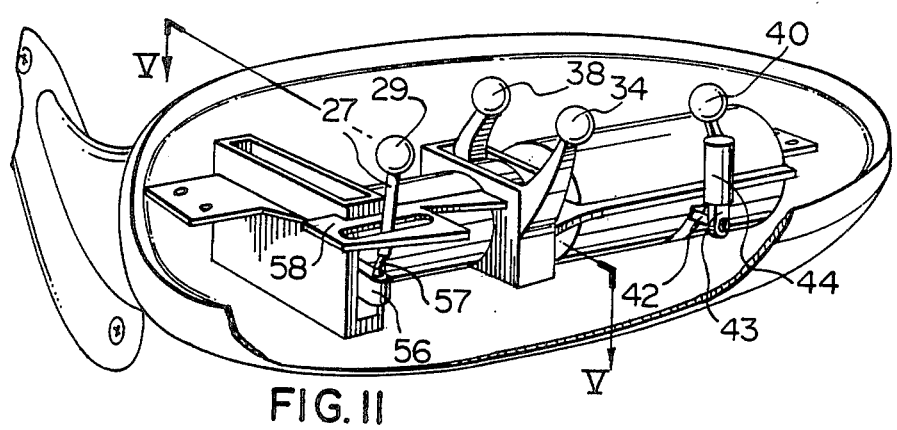
Figure 12:
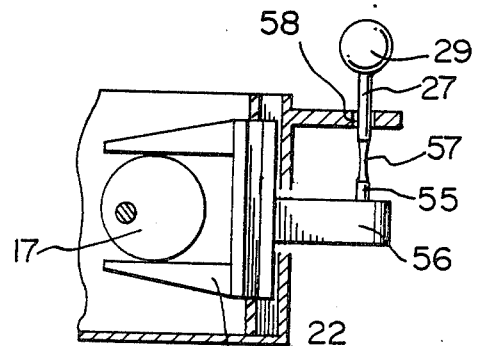

Further details of the invention will be described below on basis of three illustrative embodiments, shown in the accompanying drawing, in which FIG. 1 is a perspective view of the adjustment unit arranged in a mirror housing (with the mirror removed), FIG. 2 is a side view of the adjustment unit, FIG. 3 is a section through the adjustment unit shown in FIG. 1 along the line I—I, FIG. 4 is a perspective view of the structural part shown in FIG. 5, FIG. 5 is a section along the line II—II of the structural part shown in FIG. 1, FIG. 6 shows the structural unit which effects the separation of the movement, FIG. 7 is the slipping clutch provided between the drive motor and the drive shaft and the transmission unit, FIG. 8 is a perspective view of the adjustment unit of another embodiment arranged within a mirror housing, FIG. 9 is a longitudinal section along the line III—III of FIG. 8, FIG. 10 is a section along the line IV—IV of FIG. 8, FIG. 11 is a perspective view of another embodiment of an adjustment unit, and FIG. 12 is a section along the line V—V of FIG. 11.

In the first embodiment, shown in FIGS. 1 to 7, the electric motor with an integrated stepdown gearing and a reversible direction of rotation is designated 1 in FIG. 1.

The output shaft 2 (see FIG. 7) of the stepdown gearing arranged behind the electric motor is provided with a slipping clutch, designated generally by 3, which is formed of a thrust disc 4 connected fixed for rotation to the drive shaft 2 and a coupling disc 5 which is mounted for relative rotation and axial translation on the drive shaft 2, the clutch disc 5 being pressed against the pressure plate 4 by a leaf spring 7 which rests in a recess 6 in the drive shaft 2. The clutch disc 5 has a claw 8 which extends into a corresponding cutout 9 in a bell-shaped transmission element 10 which is fastened on the drive shaft 11 of the adjustment unit, designated generally as 12 (see FIG. 6).

The adjustment unit 12 comprises the afore-mentioned drive shaft 11 which has, approximately at its center, a coaxial cylinder 13, 14 of larger diameter connected fixed for rotation with it, which cylinder is subdivided by a central annular shoulder 15 into a left cylinder section 13 and a right cylinder section 14, and eccentrics 16, 17 which are mounted for rotation on the drive shaft 11 on both sides of the cylinder 13, 14, the eccentrics having cylindrical sections 18 and 19 respectively which are coaxial to the drive shaft 11 and have a diameter corresponding to the cylinders 13, 14.

The cylindrical sections, 13, 18 and 14, 19 respectively are surrounded in each case by a wrap spring 20 and 21 respectively, wound in the same direction, so that upon rotation of the motor in one direction the right-hand ecentric 17 for instance is driven along while the left-hand eccentric 16 remains stationary, and in the other direction of rotation of the motor the eccentric 18 is turned while the eccentric 16 is stationary.

Referring to FIGS. 3–4 eccentric 17 is developed as a circular disc which is surrounded, without play, by a fork element 22, possibly under tension, in such a manner as to produce such an amount of friction that the eccentric cannot be carried along in the free-running direction of the wrap spring 21. The fork element 22 is provided with lateral incisions 23 into which corresponding guides 24 engage so as to produce an I-guide without play.

On the base 25 of the fork element 22 there is fastened a drive pin 26 on which a flat lever 27 is mounted and guided laterally between the base 25 of the fork element 22 and the housing section 28. The flat lever 27 bears at its free end a ball 29 which engages without play into a ball socket 32 formed on the rear 30 of a mirror support plate 31.

The movement of the eccentric disc 17, (FIGS. 3-4, 6) which is in its central position when the mirror is in its basic position, is transmitted by means of said elements to the mirror holder (support plate) 31 (FIGS. 2, 3) which in this way is swung in a vertical axis, together with a mirror 33 in it, around a pivot point formed by another ball joint 34, 35 (see FIG. 1).

The rotary movement of the eccentric disc 17 is limited to such a region that it in no case comes into its dead-center position but rather remains outside the self-locking region so that, in case of failure of the drive unit, the mirror can be adjusted by hand by applying a suitable pressure, in which case the slipping clutch 3 of FIG. 7 then slips.

As can be noted from FIG. 5, the second eccentric 16 is combined with an eccentric ring 36 which surrounds the eccentric 16 without play and cooperates, via a rod 37 which is developed thereon and has a ball 38 on its end, with another ball socket 39 on the mirror side. The eccentric 16 also moves outside of its self-locking region so that, in this case also, manual adjustment of the mirror—this time in the horizontal axis—remains possible in the event of the failure of the drive unit.

The tilting of the mirror in the horizontal axis again takes place around fixed pivot point (ball joint 34, 35, noting in this connection FIGS. 2 and 5).

Due to the construction and manner of operation of the adjustment device described above with respect to FIGS. 1-7, the suspension points 29, 32 and 34, 35 and 38, which furthermore are arranged at right angles to each other, lie relatively close to each other so that although the fixed suspension point 34, 35 is located substantially at the center of gravity of the mirror 31, 33, considerable moments of rotation, particularly around the vertical axis, which come from the mirror and its support upon travel as a result of jars and vibrations, can act on the points of suspension. Therefore additional measures must be provided in order to obtain an absolutely vibrationless mounting of the mirror.

In FIGS. 1 and 2, another suspension 40, 41, again in the form of a ball joint, is provided for this purpose on the extension of the connecting line of the suspension points 29, 32 and 34, 35, at a distance from the latter.

This suspension is developed as a dampening element for the mirror 31, 33 and for this purpose is developed as a piston-cylinder element, the piston 43 which is fastened pivotally via a bolt 42 to the adjustment unit being received with friction by the cylinder 44 which bears the ball 40. The frictional force present thereby between the piston 43 and the cylinder 44 is so designed that upon travel, forces coming from the mirror 31, 33 are not able to overcome this friction, but on the other hand the adjustment forces coming from the adjustment unit 17, 22, 29 can overcome the friction so that in this way the adjustability of the mirror is assured. If necessary, the suspension 40, 41 can be arranged outside the line connecting the suspension points 29, 32 and 34, 35 so that then a damping around the horizontal mirror axis is additionally established.

Another type of vibrationless suspension and dampening of the mirror is produced in the second embodiment, shown in FIGS. 8 to 10.

In the following description the same reference numbers as used in connection with the first embodiment are employed for the same structural parts.

In addition to the rigid suspension 34, 35 for the mirror 31, 33 which has already been described in the first embodiment and the movable suspension 38, 39 provided for the horizontal tilting of the mirror, a semi-circular yoke 45 is provided which at its ends bears balls 46 and 47 which form two ball-joint suspensions with corresponding ball sockets 48 and 49 arranged on the mirror side. This yoke 45 is so guided and mounted, without play, with friction in guides 50 and 51 which are developed on the adjustment unit that it can move around the rigid ball joint 34, 35. Therefore the yoke 45 including the balls 46, 47 developed on its free ends is at the same distance from the center point of the rigid ball joint 34, 35.

The mounting of the yoke, which is effected under tension in the guides 50 and 51, again exhibits such friction that forces coming from the mirror cannot overcome the friction in the mount but can overcome the adjustment forces produced by the adjustment unit. These adjustment forces, as can be noted from FIGS. 9 and 10, are transmitted via a drive pin 52, which is fastened to the fork element 22 and engages in a slot 53 developed on the yoke 45, to the yoke 45 and via it to the mirror 31, 33.

In FIGS. 11 and 12 there is furthermore shown a modified articulation of the mirror 31, 33 to the adjustment device shown in FIG. 3 which can be used in the event that the push rod 27 which effects the transmission force between the fork element 22 and the mirror 31, 33 consists of suitable plastic. For this case, in which advantageously the fork element is also made of the same plastic and in one piece with the push rod 27, the push rod 27 is provided near its base 55 by which it is fastened to an arm 56 of the guided fork element with a tapered or grooved section 57 which is so developed that a bend joint is produced and the push rod 27 is movable in the extension of the connecting line of the ball joints 40, 41 and 34, 35. In the direction perpendicular thereto in the plane of the mirror, on the other hand, movement of the push rod with its ball joint 29 is prevented, for which purpose a slot guide 58 rigidly connected with the displacement unit is provided, within which guide the push rod 27 is supported without play.

Actual practice has shown that, with a few exceptions, the greatest part of the structural elements can be made of plastic without the operability and reliability of the adjustment device being impaired in any way while the cost of manufacture can be considerably decreased.

We claim:

1. A remote-controlled rear-view mirror assembly having a mirror which is movably supported in a housing and can be adjusted by an electric motor from a remote point, comprising an electric motor mounted in the mirror housing and having an electrically reversible direction of rotation and a stepdown gearing, a drive shaft having approximately at its center a driven coaxial cylinder of enlarged diameter with respect to the diameter of said drive shaft and a central annular shoulder dividing said coaxial cylinder into two substantially equal sections, a slipping clutch connects said motor with said drive shaft, two eccentrics rotatably mounted on said drive shaft on opposite sides respectively of said equal sections of said coaxial cylinder, each of said eccentrics comprises a cylindrical section and an eccentric disc, two wrap springs, each of said wrap springs being wound in the same direction partly on one of said two equal sections and partly on said one of said cylindrical sections, respectively, and transmission means for connecting said eccentric discs respectively to the mirror.

2. The remote-controlled rear-view mirror according to claim 1, wherein said transmission means comprises a guided fork element engagingly surrounding a first of said eccentric discs on opposite peripheral sides without play, a laterally guided push rod is connected to said fork element, means for supporting said mirror forming an articulation socket, and an articulation ball on said push rod cooperates with said articulation socket on said supporting means.

3. The remote-controlled rear-view mirror according to claim 1, wherein said transmission means comprises a floatingly mounted eccentric ring surrounding one of said eccentric discs without play, said eccentric ring has a push rod with a free end, means for supporting said mirror forming an articulation socket, an articulation ball on said free end cooperates with said articulation socket on the mirror supporting means.

4. The remote-controlled rear-view mirror according to claim 1, further comprising means for supporting said mirror, said eccentrics, said wrap springs and said drive shaft constitute an adjustment device, a damping means for stabilizing the mirror supporting means with respect to the adjustment device.

5. The remote-controlled rear-view mirror according to claim 4, wherein said transmission means comprises a floatingly mounted eccentric ring surrounding one of said eccentric discs without play, said eccentric ring has a first push rod with a free end, said means for supporting said mirror forming articulation sockets, a guided fork element engagingly surrounding a first of said eccentric discs on opposite peripheral sides without play, a laterally guided second push rod is connected to said fork element, articulation balls respectively on said free end of said first push rod, on said second push rod and on a portion fixed to the housing cooperate with said articulation sockets respectively on the mirror supporting means, said articulation balls and sockets constitute suspension points, said damping means acts outside of imaginary connecting lines of said suspension points at a greatest possible distance therefrom same on the mirror supporting means.

6. The remote-controlled rear-view mirror according to claim 4, wherein said transmission means comprises a guided fork element engagingly surrounding a first of said eccentric discs on opposite peripheral sides without play, a laterally guided push rod is connected to said fork element, said means for supporting said mirror forming articulation sockets, articulation balls on said push rod and on a portion fixed to the housing cooperate with said articulation sockets on the mirror supporting means, said articulation balls and sockets constitute suspension points, said damping means acts in an extension of an imaginary connecting line of said suspension points on the mirror supporting means spaced from said articulation ball on the portion fixed to the housing and the corresponding said socket.

7. The remote-controlled rear-view mirror according to claim 4, wherein said damping means comprises a friction damper.

8. The remote-controlled rear-view mirror according to claim 7, wherein said damping means comprises a cylinder and a piston, the latter moves in said cylinder under tension.

9. The remote-controlled rear-view mirror according to claim 4, wherein said damping means produces frictional force greater than the forces coming from the mirror and said mirror supporting means upon travel and less than adjustment force exerted by the adjustment device on the mirror supporting means.

10. The remote-controlled rear-view mirror according to claim 1, wherein said transmission means includes a damping means for the mirror constituting a combined transmission and damping element.

11. The remote-controlled rear-view mirror according to claim 10, further comprising means for supporting said mirror forming articulation sockets, said combined transmission and damping element comprises a semi-circular yoke having ends, a ball on each of the ends of said yoke, said balls are mounted in said sockets on the mirror supporting means and constitute two ball joint suspensions for the mirror supporting means, a ball fixed to the housing is mounted in another of said articulation sockets forming a fixed ball joint, said eccentrics, said wrap springs and said drive shaft constitute an adjustment device, means for displaceably guidably mounting said yoke without play and with friction on the adjustment device such that the fixed ball joint forms the center of its movement of rotation, and said yoke has a guide slot, said transmission means comprises a guided fork element engagingly surrounding a first of said eccentric discs on opposite peripheral sides without play, a laterally guided push rod is connected to said fork element, a drive pin is rigidly connected with the fork element and engages into said guide slot.

* * * * *